Oct. 11, 1966 K. W. KLEIN 3,278,707
CIRCUIT BREAKER WITH AMBIENT-TEMPERATURE COMPENSATING MEANS
Filed Oct. 22, 1964 3 Sheets-Sheet 1

INVENTOR.
KEITH W. KLEIN
BY Robert F. Casey
ATTORNEY

United States Patent Office 3,278,707
Patented Oct. 11, 1966

3,278,707
CIRCUIT BREAKER WITH AMBIENT-TEMPERATURE COMPENSATING MEANS
Keith W. Klein, Simsbury, Conn., assignor to General Electric Company, a corporation of New York
Filed Oct. 22, 1964, Ser. No. 405,699
9 Claims. (Cl. 200—116)

The present invention relates to electric circuit breakers, and more particularly to circuit breakers of the type incorporating thermal current responsive means to cause tripping upon the occurrence of predetermined abnormal current conditions therethrough.

Thermal current responsive means have been used for many years in electric circuit breakers to detect abnormal current conditions to cause actuation of the circuit breaker to interrupt the circuit. Such thermal current responsive means have two major advantages over other types of current responsive means such, for example, as magnetic current responsive means. These advantages are: (1) thermal current responsive means have an inherent heat storage characteristic which can be made to match quite closely the heat storage characteristics of the circuit conductors which electric circuit breakers are ordinarily utilized to protect. Secondly, thermal current responsive means can be constructed relatively inexpensively, by use of bimetallic current responsive members, such as an elongated strip of bimetallic material.

Thermal current responsive means, however, have a characteristic not shared by magnetic type devices which, although it is a further advantage in some applications, constitutes a disadvantage in certain other applications. This characteristic is the fact that thermal current responsive devices are affected by heat which originates from sources other than the particular heat sources which are primarily intended to affect them. More specifically, such devices are affected by the temperature of the circumambient air (referred to hereinafter for convenience simply as "ambient temperature." Thus, for example, a circuit breaker including a thermal current responsive means may sometimes trip and disconnect the circuit primarily because the temperature of the surrounding air has increased to a predetermined point, even though the current through the circuit breaker has not reached a level which would ordinarily be dangerous. For this reason, it is customary to advise users of thermal current responsive devices such as circuit breakers, that the device must be "derated" if used at elevated ambient temperatures. In other words, the user is advised for example that a circuit breaker which is rated at 15 amperes will carry 15 amperes indefinitely at an ambient temperature of 25° C. At an ambient temperature of 50° C., however, the same breaker will carry not more than 13.8 amperes without tripping. The breaker must therefore be derated to 92% of its nominal value if used in an ambient of 50° C. As previously mentioned, such "ambient sensitivity" is sometimes desirable, for the following reason. The ultimate object of automatic circuit protection is to prevent the conductor which is connected to the protecting device from reaching a temperature which might be dangerous to itself, such as by causing melting, or might be dangerous to adjacent material such as the wire insulation or adjacent building material, so as to possibly start a fire. It will be apparent that if a large portion of the temperature of the conductor is caused by means such as by a high ambient temperature, then the conductor should not be permitted to carry as much current as it otherwise could.

Nevertheless, up until a certain danger point is reached, it is desirable to prevent ambient temperature from unduly restricting the ability of a circuit protective device to remain in the closed condition. For this reason, a variety of schemes have been devised over the years for "compensating" or correcting thermal current responsive devices for ambient temperatures. Such "ambient compensation" means have commonly included the use of supplementary bimetallic strip means which is exposed to the ambient temperature in the same way that the current responsive bimetallic member is, but which is not exposed to heated caused by electrical current carried by the circuit, or at least not to the same degree as the main current responsive thermal element. Examples of thermal current responsive means including such ambient compensating structures, are shown in the following patents: 2,253,390, Muller; 2,703,351, Hulbert.

All of such prior art ambient compensating or correcting means for thermal current responsive devices have shared a major disadvantage in common. This disadvantage is that they have added significantly to the cost of such devices. In addition, since they have commonly added more parts and complicated the structure involved, their use increases the likelihood of some difficulty being encountered in the use of the device.

A further disadvantage of such prior art structures is that since they have ordinarily involved the use of a supplementary bimetallic member which acts contrary to the action of the main current responsive bimetal, the compensating action becomes greater with greater ambient temperatures, without practical limit. The use of such ambient compensating structures over a period of years has made it evident that some means should be used to limit the compensating action. Thus, for example, if the ambient temperature surrounding a circuit protective device increases to extremely high values, such, for example, as because of a fire nearby, it would be desirable for the protective device to operate to a tripped condition for general safety purposes. This would not be possible with prior art ambient compensating schemes. For such reasons, it has been found necessary to include in devices of this type some means for "limiting" the compensating action provided, so that the compensating means operates over a certain range of ambient temperature, but after a certain predetermined ambient temperature is reached, the compensating means no longer functions. Examples of ambient compensating structures including such limiting means are shown, for example, in the following patents: 2,214,640, Marshall; 2,656,440, Dorfman.

In accordance with applicant's present invention, a thermal current responsive device is provided which does not include a separate ambient compensating element, but which exhibits an ambient correcting or compensating action which is virtually indistinguishable from the action of prior art thermal current responsive devices including separate ambient compensating means. This is achieved, moreover, without the use of any more parts than utilized in prior art uncompensated thermal current responsive devices.

In brief, the present inventor has discovered that the action of ambient temperature on a bimetallic strip can be distinguished from the action of heat caused by electric current therethrough even though the current passes through the entire length of the bimetallic strip in question.

Accordingly, it is an object of applicant's invention to provide a thermal current responsive device which is not adversely affected by elevated ambient temperatures, and which does not require the use of a separate ambient compensating means.

It is another object of applicant's invention to provide an electric circuit protective device including a thermal current responsive means which is not adversely affected by elevated ambient temperatures because of the inclusion of correcting means, and which does not require means limiting the action of the corrective means at extremely elevated ambient temperatures.

It is a further object of the invention to provide an electric circuit protective device including a thermal current responsive means which may be readily combined with a magnetic current responsive means without adversely affecting the action of the magnetic current responsive means and without complicating the physical structure involved.

Further objects and advantages of the invention will in part be pointed out in part become obvious from the following detailed description.

In accordance with applicant's invention, a circuit protective device is provided incorporating thermal current responsive means including an elongated bimetallic strip and means for heating the bimetallic strip in accordance with current passing through the circuit breaker. Means is also provided connecting the movable end of the current responsive bimetallic strip to a latch member to cause releasing movement of the latch member on the occurrence of predetermined current conditions. The aforesaid means connecting the bimetallic strip and the releasable latch member is constructed in such a way as to provide a corrective action upon deflection of the bimetallic strip. That is, its motion includes a component which, relative to the bimetallic strip, is in a direction to counteract the main tripping motion of the bimetallic strip. When the bimetallic strip is heated solely by ambient temperature, this corrective action is more accentuated than when the strip is heated solely by electric current. Because of this, the assembly exhibits the characteristics of an ambient-compensated thermal responsive means without the necessity for use of a separate ambient compensating bimetallic member.

In accordance with applicant's invention in one form, the connecting means comprises a rigid member having one end thereof connected to the movable end of the bimetallic strip and having its major portion extending generally parallel to the bimetallic strip in the direction toward the fixed end thereof and terminating in a latch-actuating portion which is spaced from the bimetallic strip a predetermined distance. The arrangement is such that upon heating of the bimetallic strip due to current passing therethrough, the spacing of the latch actuating portion of the connecting member from the body of the bimetallic strip does not change appreciably, but when the bimetallic strip is heated by ambient temperature, the spacing of the latch actuating portion of the connecting member from the main body of the bimetallic strip does increase significantly, thereby counteracting the general effect of deflection of the main portion of the bimetallic strip, and providing a corrective action.

The invention will be more fully understood from the following detailed description, and its scope will be pointed out in the appended claims.

Figure 1:
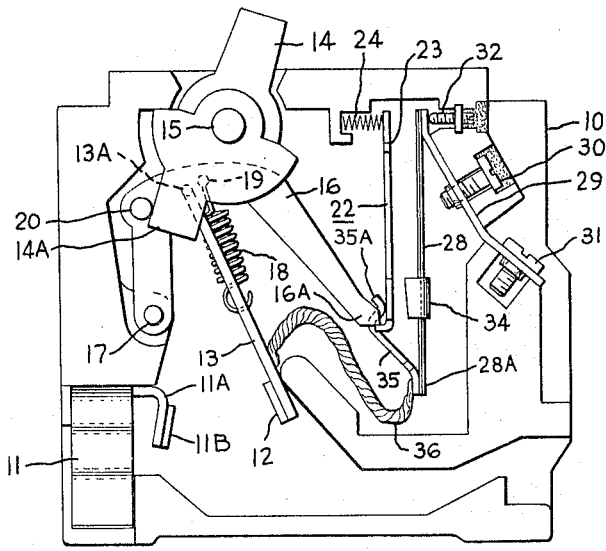
FIGURE 1 is a side elevation view of an electric circuit breaker constructed in accordance with the invention, a part of the insulating casing closest to the observer being omitted to show the internal parts.

Referring first to FIGURE 1, the invention is shown as incorporated in an electric circuit breaker comprising a generally rectangular insulating casing, including a generally tray-shaped body portion 10 and a generally planar cover, not shown, fitting on the body 10 and closing the side exposed to the observer in FIGURE 1.

A stationary line terminal member 11 is mounted in a conforming recess in the casing 10. The line terminal 11 is generally U-shaped and is adapted to receive a blade-type stationary terminal, not shown. The terminal 11 includes an integral lug portion 11A carrying a stationary contact 11B thereon. A movable contact 12 is fixedly carried by a contact arm 13. The contact arm 13 is pivotally mounted at a pivot point 13A on an insulating handle 14, which in turn is pivotally supported in the casing 10 on an integral pivotal support or hub 15. A generally U-shaped releasable support 16 is also pivotally supported in the casing body 10 on a pivot pin 17, and a tension-type operating spring 18 is interconnected between the contact arm 13 and an anchor point 19 on the handle 14. Rotation of the handle 14 about its pivotal support 15 in the casing moves the pivotal support point 13A of the contact arm 13 back and forth across the line of action of the tension spring 18 and moves the contact arm 13 between open and closed circuit positions with respect to the stationary contact 11B with a snap-action.

The end 16A of the releasable support 16 remote from its pivotal supporting pin 17 is releasably latched in the position shown in FIGURE 1 by current-responsive means to be described.

When the contact arm 13 is in closed-circuit position and the support member 16 is released from the current-responsive means, the tension spring 18 acts on it to cause rotation in clockwise direction as viewed in FIGURE 1. Clockwise rotation of the support member 16 moves the anchor point 19 of the spring 18 across the pivot point 13A of the contact arm 13, thereby reversing the bias of the spring 18 on the contact arm 13 and moving the contact arm to automatically-opened or "tripped" position.

Following tripping action, the parts may be returned to the "off" position as indicated in FIGURE 1 by rotating the handle 14 clockwise about its pivotal support 15 back to its FIGURE 1 position. This causes the projection 14A of the handle 14 to engage a pin 20 carried by the releasable support member 16, and to rotate the support member 16 counterclockwise about its pivotal support 17 to relatched position as shown in FIGURE 1.

It should be understood that the particular operating mechanism utilized may be of any suitable type including a member which is moved to cause automatic opening, and that the particular mechanism illustrated herein is chosen merely as an example. The construction and operation of the mechanism illustrated is more specifically described in co-pending application S.N. 405,757 filed concurrently herewith and assigned to the same assignee as the present invention.

*Current responsive means*

For the purpose of normally restraining the releasable support member 16 and for releasing it upon the occurrence of predetermined conditions in accordance with the invention, current responsive means is provided which will now be described. The current responsive means includes a combined armature-latch member of sheet metallic material 22, which is pivotally supported at 23 in the insulating casing, and is biased for clockwise rotation about its pivotal support by a compression spring 24. The armature-latch member 22 includes a widened portion 25 to enhance its operation as a magnetic armature, in a manner to be described, and an integral bent-over latch projection 26.

An elongated bimetallic strip 28 is also included which is rigidly attached by suitable means, such as by welding, to an end portion 29A of a terminal strap member 29. The terminal strap member 29 is fixedly attached to the insulating body 10 at an intermediate point by suitable means such as by a screw 30, and includes at its outer end a wire-connecting screw 31.

For the purpose of adjustably positioning the bimetallic strip 28, a calibrating screw 32 is provided which is threadedly engaged in a nut 33 trapped in a conforming recess in the body 10. The inner end of the screw 32 bears on the end 29A of the strap 29, and adjustment of the screw 32 causes more or less bending of the strap 29 intermediate the end 29A and the screw 30, thereby changing the angle of the bimetallic strip 28 in the casing 10.

The bimetallic strip 28 also carries a generally U-shaped magnetic field piece 34 attached thereto by suitable means such as by welding.

Figures 2, 3, 5:
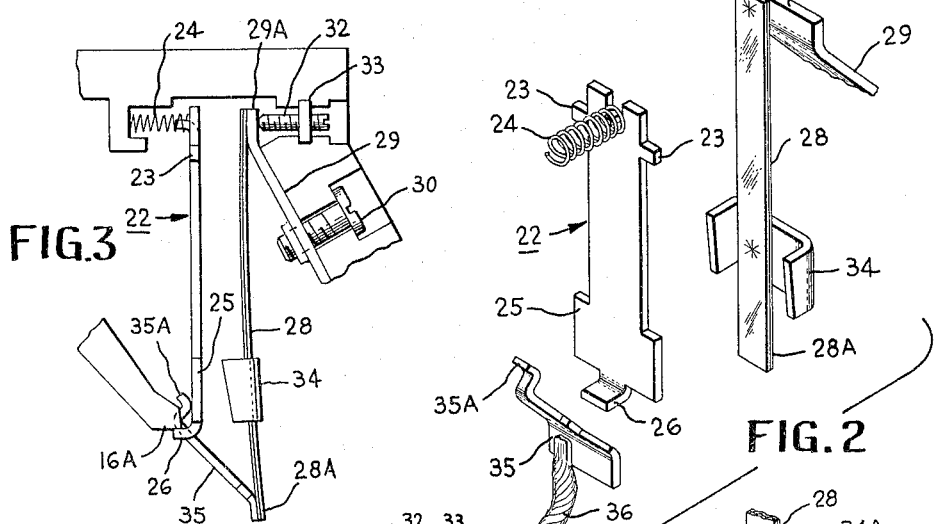
FIGURE 2 is a perspective view of the current responsive means of the circuit breaker of FIGURE 1.
FIGURE 3 is a side elevation view of a portion of the circuit breaker of FIGURE 1, the parts being shown in a condition which they assume when the assembly is heated substantially entirely by elevated ambient temperature.
FIGURE 5 is a fragmentary perspective view of a portion of thermal current responsive means of another embodiment of the invention.
Figure 4:
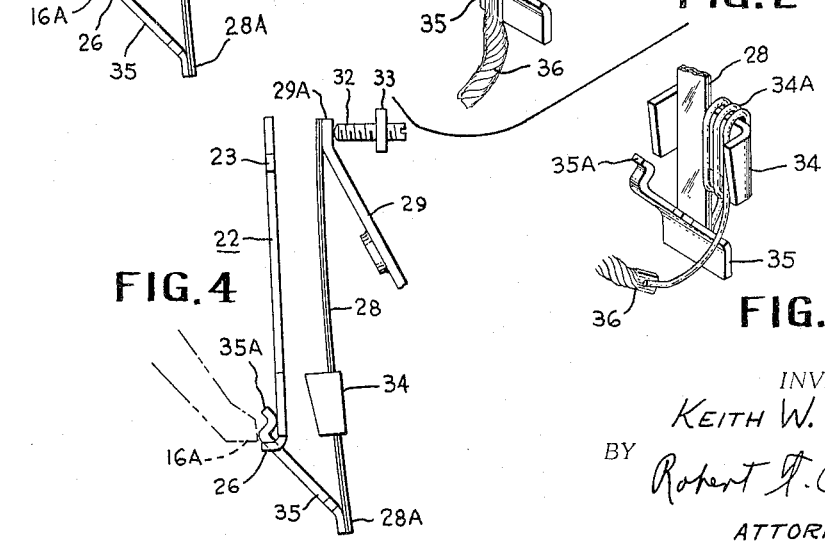
FIGURE 4 is a view similar to FIGURE 3, but showing the parts in a thermally tripped condition.

The bimetallic strip 28 is connected to the armature-latch member 22 by means of an angularly-extending connecting piece 35. The movable end of the bimetallic strip 28 is electrically connected to the movable contact member 13 by means of a flexible conductor 36. The current path through the circuit breaker therefore is from the line terminal 11 to the stationary contact 11B, to the movable contact 12, to the flexible conductor 36, to the movable end of the bimetallic strip 28, to the terminal strap 29, to the load terminal 31. The current responsive means operates to cause release or tripping of the circuit breaker in either one of two ways, depending upon the magnitude of the excess current, that is, either magnetically or thermally. Magnetic tripping takes place upon the occurrence of extremely high overload currents, such as those of short-circuit value. The magnetic field piece 34 is energized and attracts the armature portion 25 of the armature-latch member 22, and withdraws the latch projection 26 from the portion 16A of the member 16 against the bias of the spring 24, thereby causing tripping. In accordance with the embodiment of the invention shown in FIGURE 5, the sensitivity of magnetic field piece 34 may be greatly increased by the provision of additional turns such as 34A which are between the bimetallic strip 28 and the flexible conductor 36. The addition of the extra coils 34A is made possible by making the magnetic field piece 34 substantially wider than the bimetallic strip 28.

Thermal tripping takes place upon the occurrence of electrical currents which are above the normal or rated value of the circuit breaker and below the excessively high or short-circuit values which cause magnetic tripping. Such intermediate overload currents cause warping of the bimetallic strip 28 so as to move the lower end thereof to the right as viewed in FIGURE 1, thereby acting through the means of the connecting means 35, on the armature-latch member 22 to move it to the right to cause tripping.

In accordance with the invention, the thermal tripping means comprising the bimetallic strip 28, the latch 22, and the connecting means 35, is so constructed in such a manner that elevated ambient temperatures do not have the adverse effect upon the thermal tripping characteristics which they do in comparable prior art thermal current responsive devices. Because of the construction provided by the present invention, the thermal tripping means responds with a greater latch-moving action to heating due to electric current than to heating due to elevated ambient temperatures. It is possible, in accordance with the invention to construct a thermal current responsive device which is entirely unaffected by elevated ambient temperatures. In the preferred form, however, the current-responsive means of the invention is slightly sensitive to heating due to ambient temperature action. This is for purposes of safety, since it is desired to allow the circuit breaker to trip if the bimetallic strip is heated due solely to ambient temperature of a sufficiently high degree.

In accordance with the invention, the connecting member 35 which connects the movable end of the bimetallic strip 28 to the latch member 22 extends a substantial distance back toward the fixedly mounted end of the bimetallic strip 28, and the end 35A engages the latch member 22 at a point spaced a substantial distance from this movable end.

In accordance with a particular embodiment of the invention, it has been found that an adequate ambient correcting or compensating action is obtained which meets all requirements of such devices, including the requirements of the Underwriters' Laboratories for ambient-compensated circuit breakers, with a construction as follows: Circuit breaker rating 15 amperes; bimetallic strip total length 1.750 inches; length of connecting member .750 inch; original distance of end 35A from the nearest point of the bimetallic strip .187 inch. The significant characteristics of this embodiment are shown in the graph entitled "Derating Curve" of FIGURE 11. This graph indicates the percentage of derating which is necessary for various ambient temperatures. The line A represents the curve of a prior art breaker of this corresponding type without ambient compensating action. Line B represents the corresponding curve of the above-mentioned embodiment of the present invention.

Figure 11:
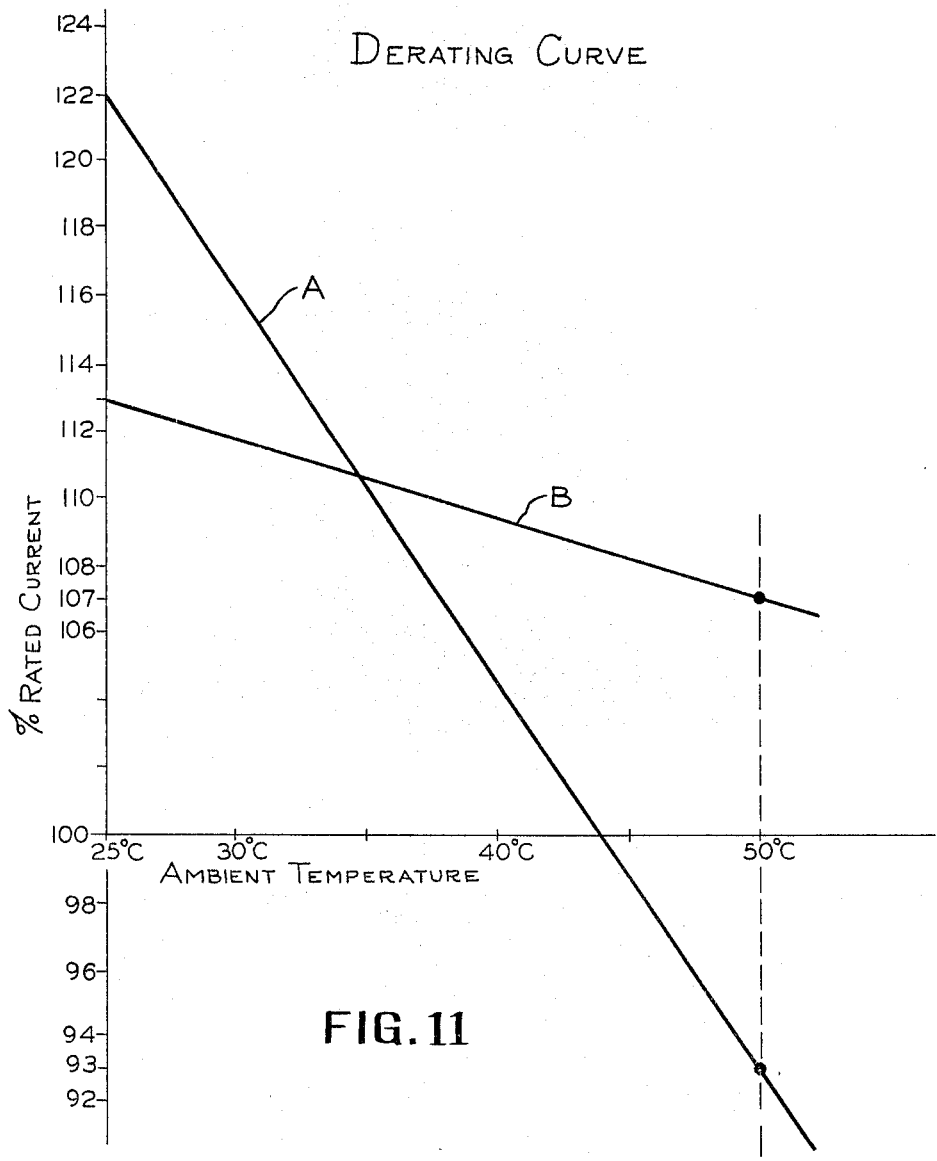
FIGURE 11 is a graphical representation showing various characteristics of the invention.

As indicated in the graph of FIGURE 11, the prior art circuit breaker is capable of carrying 122% of its normal rated current at an ambient temperature of 25° C. When the ambient temperature is increased to 50° C., however, this same circuit breaker will carry only 93% of its rated current without tripping. The circuit breaker constructed in accordance with the present invention, however, carries 113% of its rated current at 25° C., and at 50° C. carries 107% of its rated current. In other words, the current-carrying capacity of the circuit breaker incorporating the present invention is much less affected by ambient temperature than the illustrated prior art circuit breaker.

It is not certain that the theory of operation of applicant's invention is completely understood. This is because its operation involves the interaction of many factors such as: rate of heat generation by electric current in the various conducting parts; rate of heat exchange of both generated heat and heat from the circumambient air, by conduction, radiation and absorption; friction forces; and deflection versus loading characteristics of the bimetallic member, all of which act over a period of time during which all or most of these factors are acting dynamically. It is applicant's hypothesis, however, that the invention operates in accordance with the following principles.

It is believed that the basic principle on which applicant's invention operates is that there is a difference in the deflecting action of a bimetallic strip of the type illustrated when it is heated by ambient temperature as compared to its deflection when it is heated by the passage of electric current therethrough. Specifically, when the bimetallic strip is heated by ambient temperature, it is heated uniformly throughout, and all adjacent parts and parts in contact with it are also heated at substantially precisely the same rate. Thus, all points of the bimetallic strip 28, as well as the magnetic field piece 34, the terminal strap 29, and the flexible conductor 36 all have substantially the same temperature at all times. Accordingly, if the ambient temperature is increased, the temperature of all these parts increases uniformly therewith. When the bimetallic strip is heated by such ambient temperatures therefore, it deflects equally throughout its length and assumes a condition closely approximating a segment of a circle, the radius of the circle decreasing as the ambient temperature is increased.

When the bimetallic strip 28 is heated by the passage of current therethrough, however, it is not heated uniformly throughout its length even though the current passes through the entire strip. This is because the heat generating, heat storage, and heat radiating characteristics of the various components involved are different. Specifically, it is believed that when bimetallic strip 28 is heated by current passing therethrough, it deflects more sharply adjacent its fixedly supported end than it does adjacent its movable end. This is believed to be due to several factors such as the fact that the conductor 29 is ordinarily selected to act partly as a heater, whereas the flexible conductor 36 is not. In addition, the magnetic field piece 34 acts as a "heat sink" and also as a heat radiator.

The net result, therefore, is believed to be such that on current-generated thermal tripping, most of the deflection which operates to move the end 35A occurs in the upper portion of the bimetallic strip 28. Since heating occurs primarily by current, the lower part of the bimetallic strip does not deflect as much as the upper portion, and the net result of the components of movement on the member 35 is such as to move the portion 35A to the right to cause tripping.

When deflection occurs primarily because of elevation of ambient temperature, however, the lower portion of the bimetallic strip 28 deflects equally with the upper portion, and the movable end 28A of the bimetallic strip 21 not only moves to the right as viewed, but also changes its angle substantially as it does so. This change of angle tends to tilt the connecting member 35 counterclockwise with respect to its original position, thereby moving the end 35A to the left as viewed. This tilting action tends to offset or counteract the movement of the piece to the right as viewed, and provides a compensating action.

Figure 6:
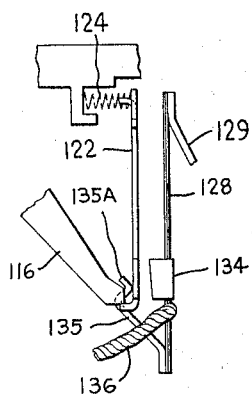
FIGURE 6 is a side elevation view of the thermal current responsive means of a third embodiment of the invention.
Figure 7:
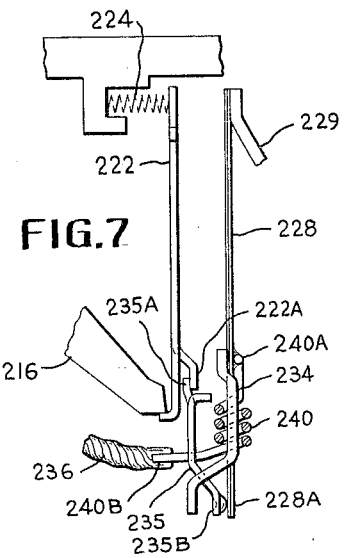
FIGURE 7 is a side elevation view of a thermal current responsive means of a fourth embodiment of the invention.

In the embodiment of the invention shown in FIGURE 6, there is illustrated an expedient whereby the compensating action of the assembly can be further increased by passing current only through the major upper portion of the bimetallic strip 128. The operation of this form of the invention is substantially the same as that described in connection with FIGURES 1 through 5. The form shown in FIGURES 1 through 5, is preferred for use in applications of relatively low rated breakers, such for example as 15–20 amperes, and the form shown in FIGURE 6 is preferred for use in higher rated breakers such for example as 30–50 amperes.

In FIGURES 7–10, there is shown another embodiment of the invention. In accordance with this embodiment, a bimetallic strip 228 has a magnetic field-piece 234 rigidly attached thereto at the point 234A by suitable means such as by welding. The member 234 has an opening or window 234B through which a portion of the bimetallic strip 228 extends, so that a portion of the bimetallic strip 228 lies in the same plane as a portion of the member 234.

An armature piece 235 is hingedly supported on the lower end of the magnetic field-piece 234 and includes a projecting lug 235A which engages a bent-out tab or lug 222A of the latch member 222. A coil 240 is wound about the field piece 234, also encircling the portion of the bimetallic strip 228 that passes therethrough. One end 240A of the coil 240 is rigidly connected to the bimetallic strip, by suitable means such as by welding, adjacent the fixedly mounted end of the field-piece 234. The other end 240B of the coil 240 is connected to the flexible conductor 236. The lower end of the bimetallic strip 228 therefore is not in the electrical circuit, which passes from the flexible conductor 236 through the coil 240 to the bimetallic srip 228, and out the terminal strap 229.

The thermal-deflecting and ambient-correcting action of this form of the invention is generally similar to that of FIGURE 6. It will be noted in this connection that the spacing of the lug 235A from the main body of the bimetalic strip, which controls the amount of latch engagement, is controlled by an extension 235B which engages the lowest extreme end 228A of the bimetallic strip 228. Deflection of the lower end of the bimetallic strip 228, occurs primarily due to ambient-temperature changes, and this permits the lug 235A to move away from the body of the bimetallic strip, in a correcting direction. Thermal tripping occurs by deflection of the upper portion of the bimetallic strip 228, which moves the lower assembly to the right as viewed substantially as a unit, to cause tripping movement of the latch 222.

Figure 9:
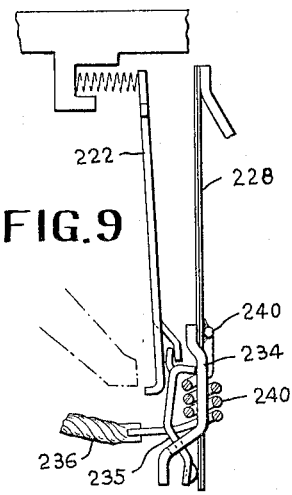
FIGURE 9 is a view similar to FIGURE 7 but showing the parts in a position which they occupy upon tripping magnetically.
Figure 8:
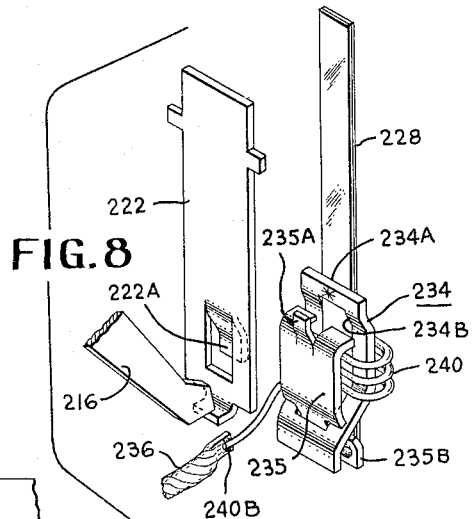
FIGURE 8 is an exploded perspective view of the thermal current responsive means of FIGURE 7.
Figure 10:
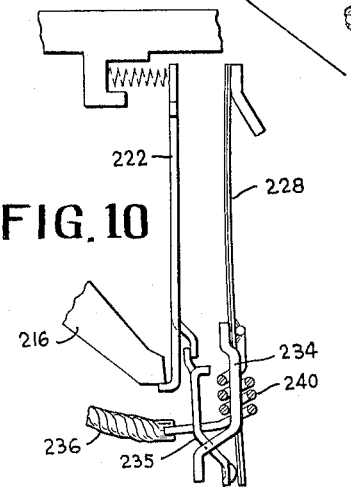
FIGURE 10 is a view similar to FIGURE 9 but showing the parts in the position which they occupied when heated primarily by ambient temperature.

In the form of the invention shown in FIGURES 7–10, the piece 235 serves also as a magnetic armature, which is attracted to the piece 234 upon the occurrence of sufficient current through the coil 240. The portion 234A of the member 234 acts as a magentic pole piece to attract the armature, as shown in FIGURE 9.

Although the invention has been described in connection with particular embodiments, it will be readily appreciated that many modifications thereof may readily be made by those skilled in the art, and it is intended therefore by the appended claims to cover all such modifications as fall within the true spirit and scope of the invention.

What I claim as new and desire to secure by Letters Patent of the United States is:

1. An electric circuit breaker comprising:
    (a) a support,
    (b) at least one pair of cooperating contacts supported on said support and movable between open and closed circuit positions,
    (c) a first member mounted on said support,
    (d) means connecting said first member to at least one of said contacts to move said contacts from said closed to said open position upon predetermined movement of said first member,
    (e) an elongated bimetallic strip fixedly mounted at one end on said support and having its other end movable,
    (f) connecting means carried by said bimetallic strip and connecting said movable end of said bimetallic strip to said first member, said connecting means comprising an elongated member having one end thereof in contact with said movable end of said bimetallic strip and extending from said one end in a direction generally parallel to said bimetallic strip toward said fixedly mounted end of said bimetallic strip and having a second end in contact with said first member at a point spaced from said movable end of said bimetallic strip in the direction toward said fixedly mounted end thereof, and means preventing said elongated member from moving away from said bimetallic strip beyond a position having a predetermined angular relation to the major planar surface of said movable end of said bimetallic strip,
    (g) said bimetallic strip having its high expansion side at the same side thereof as said connecting means, whereby uniform deflection of said bimetallic strip moves said connecting means in the general direction of movement of said movable end of said bimetallic strip and also moves said second end of said connecting means in a direction away from said high expansion side of said bimetallic strip.

2. An electric circuit breaker comprising:
    (a) a support,
    (b) at least one pair of cooperating contacts supported on said support, and movable between open and closed circuit positions,
    (c) a first member mounted on said support,
    (d) means connecting said first member to at least one of said contacts to cause movement of said contacts from said closed to said open circuit position upon predetermined movement of said first member, (e) an elongated bimetallic strip fixedly mounted on said support at one end and having its other end movable, (f) connecting means connecting said movable end of said bimetallic strip to said first member, said connecting means comprising an elongated member having a first end rigidly attached to said movable end of said bimetallic strip and extending from said first end in a direction generally parallel to said bimetallic strip toward said fixedly mounted end of said bimetallic strip and having its other end in contact with said first member, (g) said bimetallic strip having its high expansion side at the same side of said strip as said connecting means, whereby uniform deflection of said bimetallic strip moves said connecting means in the general direction of movement of said movable end of said bimetallic strip, and also changes the angular position of said connecting means with respect to said bimetallic strip to increase the distance of said other end of said connecting means from the nearest adjacent point of said bimetallic strip.

3. An electric circuit breaker comprising:
(a) a support,
(b) at least one pair of cooperating contacts supported on said support, and movable between open and closed circuit positions,
(c) a first member mounted on said support,
(d) means connecting said first member to at least one of said contacts to cause movement of said contacts from said closed to said open circuit position upon predetermined movement of said first member,
(e) an elongated bimetallic strip fixedly mounted on said support at one end and having its other end movable,
(f) connecting means connecting said movable end of said bimetallic strip to said first member, said connecting means comprising an elongated member having a first end rigidly attached to said movable end of said bimetallic strip and extending from said first end in a direction generally parallel to said bimetallic strip toward said fixedly mounted end of said bimetallic strip and having its other end in contact with said first member,
(g) said bimetallic strip having its high expansion side at the same side of said strip as said connecting means, whereby uniform deflection of said bimetallic strip moves said connecting means in the general direction of movement of said movable end of said bimetallic strip, and also changes the angular position of said connecting means with respect to said bimetallic strip to increase the distance of said other end of said connecting means from the nearest adjacent point of said bimetallic strip,
(h) a terminal member carried by said support,
(i) means electrically connecting said terminal member to said fixedly mounted end of said bimetallic strip,
(j) flexible conductor means electrically connecting said movable end of said bimetallic strip to one of said contacts, whereby electric current passing through said contacts also passes through said bimetallic strip.

4. An electric circuit breaker comprising:
(a) a support,
(b) at least one pair of cooperating contacts supported on said support and movable between open and closed circuit positions,
(c) a latch member pivotally mounted on said support,
(d) operating means connecting said latch member to at least one of said contacts to cause movement of said contacts from said closed to said open circuit position upon predetermined movement of said latch member,
(e) an elongated bimetallic strip fixedly mounted at one end on said support and having its other end movable,
(f) connecting means connecting said movable end of said bimetallic strip to said latch member, said connecting means comprising an elongated member having a first end rigidly attached to said movable end of said bimetallic strip and extending from said first end in a direction generally parallel to said bimetallic strip toward said fixedly mounted end of said bimetallic strip and having its other end in contact with said latch member,
(g) a generally U-shaped magnetic field piece fixedly attached to said bimetallic strip at a point intermediate said movable end and said fixed end,
(h) said latch member including an armature portion adjacent said magnetic field piece, said bimetallic strip extending between said field piece and said armature portion whereby current passing through said bimetallic strip energizes said field piece and causes attraction of said armature portion,
(i) said bimetallic strip having its high expansion side at the same side of said strip as said connection means whereby uniform deflection of said bimetallic strip moves said connecting means in the general direction of movement of said movable end of said bimetallic strip and also changes the angular position of said connecting means with respect to said bimetallic strip and increases the distance of said other end of said connecting means from said bimetallic strip.

5. An electric circuit breaker as set forth in claim 4 wherein said circuit breaker also includes:
(a) a terminal member supported on said support,
(b) means electrically connecting said terminal member to said fixed end of said bimetallic strip,
(c) flexible conductive means connecting said movable end of said bimetallic strip to one of said contacts,
(d) whereby electric current passing through said contacts flows through substantially all of said bimetallic strip.

6. An electric circuit breaker comprising:
(a) a support,
(b) at least one pair of cooperating contacts supported on said support, and movable between open and closed circuit positions,
(c) a first member mounted on said support,
(d) means connecting said first member to at least one of said contacts to cause movement of said contacts from said closed to said open circuit position upon predetermined movement of said first member,
(e) an elongated bimetallic strip fixedly mounted on said support at one end and having its other end movable,
(f) connecting means connecting said movable end of said bimetallic strip to said first member, said connecting means comprising an elongated member having a first end rigidly attached to said movable end of said bimetallic strip and extending from said first end in a direction generally parallel to said bimetallic strip toward said fixedly mounted end of said bimetallic strip and having its other end in contact with said first member,
(g) said bimetallic strip having its high expansion side at the same side of said strip as said connecting means, whereby uniform deflection of said bimetallic strip moves said connecting means in the general direction of movement of said movable end of said bimetallic strip, and also changes the angular position of said connecting means with respect to said bimetallic strip to increase the distance of said other end of said connecting means from the nearest adjacent point of said bimetallic strip, (h) a terminal member carried by said support,
(i) means electrically connecting said terminal member to said fixedly mounted end of said bimetallic strip,
(j) flexible conductor means electrically connecting said movable end of said bimetallic strip to one of said contacts, said flexible conductor being connected to said bimetallic strip at a point spaced from said movable end whereby electric current passing through said contacts passes through the portion of said bimetallic strip adjacent said fixedly mounted end and not through the portion of said bimetallic strip adjacent said movable end.

7. An electric circuit breaker comprising:
(a) a support,
(b) at least one pair of cooperable contacts supported on said support and movable between open and closed circuit positions,
(c) a first member mounted on said support,
(d) means connecting said first member to at least one of said contacts to cause movement of said contacts from said closed to said open circuit position upon predetermined movement of said first member,
(e) an elongated bimetallic strip fixedly mounted at one end on said support and having its other end movable,
(f) an elongated magnetic field piece having one end thereof fixedly attached to said bimetallic strip at a point spaced away from said movable end of said strip, and having its other end adjacent said movable end of said strip,
(g) a movable armature member supported on said magnetic field piece adjacent said other end thereof and having a pole portion adjacent said first portion of said magnetic field piece, said armature being pivotally movable toward and away from said field piece,
(h) means connecting said armature to said latch member,
(i) said armature member including a portion extending beyond said support of said armature on said field piece and engaging said movable end of said bimetallic strip and limiting movement of said armature away from said bimetallic strip,
(j) whereby the deflection of the said bimetallic strip between said point of attachment of said magnetic field piece and said movable end changes the angular relation of said armature to said bimetallic strip and compensates for changes in ambient temperature.

8. An electric circuit breaker as set forth in claim 7 wherein said coil is connected to said bimetallic strip at a point adjacent the point of connection of said magnetic field piece to said bimetallic strip whereby the portion of said bimetallic strip between said point of connection of said coil and said movable end of said bimetallic strip is not in electrical circuit with said contacts.

9. An electric circuit breaker comprising:
(a) a support,
(b) at least one pair of cooperable contacts supported on said support and movable between open and closed circuit positions,
(c) a trip member mounted on said support for movement between latched and released positions,
(d) biasing means biasing said trip member for movement from said latched to said tripped position,
(e) means connecting said trip member to at least one of said cooperable contacts to cause opening movements of said contacts upon movement of said tripping member from said latched to said released position,
(f) latch means normally restraining movement of said trip member from said latched toward said tripped position,
(g) an elongated bimetallic strip fixedly mounted at one end of said support, and having its other end movable,
(h) a magnetic field piece fixedly attached to said bimetallic strip at a point spaced away from said movable end and including a portion extending along said bimetallic strip,
(i) an armature member pivotally supported on said magnetic field piece and including a portion extending substantially parallel to said intermediate portion of said field piece,
(j) said armature including a portion extending beyond said pivotal support of said armature on said field piece and into engagement with said movable end of said bimetallic strip and limiting movement of said upper portion of said armature away from said bimetallic strip,
(k) and means connecting said armature to said latch member whereby movement of said latch member in a direction toward said bimetallic strip moves said latch member to release said trip member, and
(l) means for heating said first portion of said bimetallic strip in response to currrent flowing through said contact without heating said second portion of said bimetallic strip other than by conduction from said first portion, whereby said second portion of said bimetallic strip is affected primarily by ambient temperatures and deflects in a direction providing ambient compensating movement of said armature portion.

References Cited by the Examiner

UNITED STATES PATENTS

| | | | |
|---|---|---|---|
| 1,982,289 | 11/1934 | Frank et al. | 200—116 |
| 2,035,743 | 3/1936 | Frank et al. | 200—116 X |
| 2,071,848 | 2/1937 | Lindstrom | 200—116 |
| 2,312,167 | 2/1943 | Jackson | 200—88 |
| 2,494,761 | 1/1950 | Jackson et al. | 200—88 |
| 2,776,349 | 1/1957 | Thomas | 200—88 |
| 3,098,136 | 7/1963 | Stanback et al. | 200—88 |
| 3,178,535 | 4/1965 | Gelzheiser et al. | 200—88 |

FOREIGN PATENTS

| | | |
|---|---|---|
| 108,835 | 11/1939 | Australia. |
| 893,282 | 4/1962 | Great Britain. |

BERNARD A. GILHEANY, *Primary Examiner.*